Patented Dec. 1, 1953

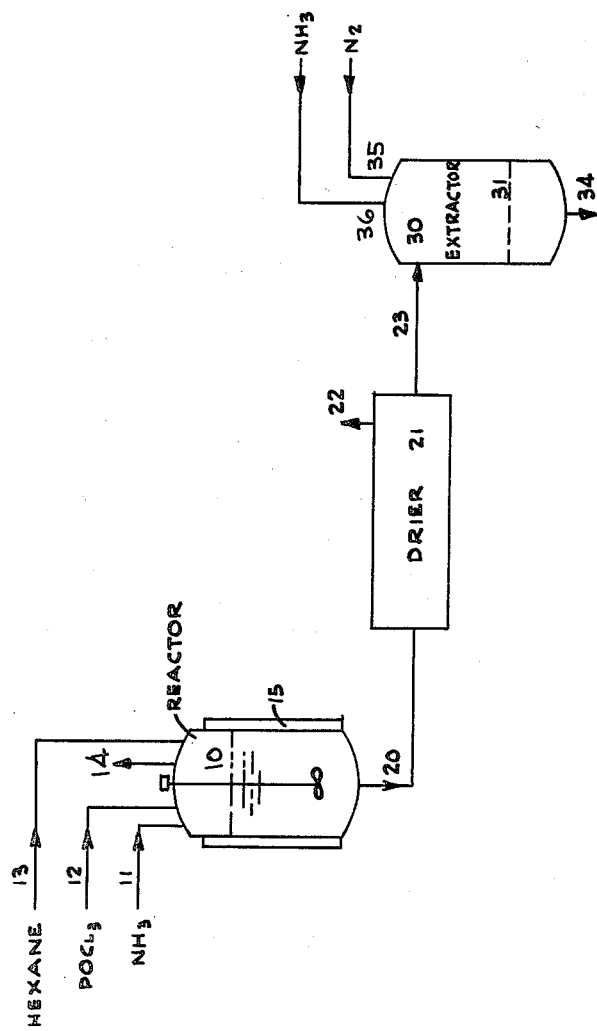

2,661,265

UNITED STATES PATENT OFFICE 2,661,265

PURIFICATION PROCESS

Donald A. High, Dayton, Ohio, assignor to Monsanto Chemical Company, St. Louis, Mo., a corporation of Delaware Application October 26, 1950, Serial No. 192,300

4 Claims. (Cl. 23—14)

1

This invention relates to a purification process which has particular utility for compositions containing principally nitrogen and phosphorus in chemically combined form.

Condensation products of ammonia with phosphorus oxychloride have been described in which low percentages of nitrogen are obtained relative to the phosphorus content. Because of the requirement for nitrogen-phosphorus compounds in flameproofing treatments an improved form of relatively higher nitrogen content has been prepared. Copending application Serial No. 169,513, filed June 21, 1950, which is assigned to the same assignee as is the present case, describes compositions containing nitrogen and phosphorus which are insoluble in liquid ammonia. Such compounds are prepared by reacting phosphorus oxychloride with ammonia in an inert solvent at a temperature below 100° C. to produce a primary reaction product mixed with by-product ammonium chloride. Such reaction mixture is then heated to a temperature of at least 100° C., but below 150° C., whereupon it is found that the initially formed product is changed from an ammonia-soluble form to one which is substantially insoluble in liquid anhydrous ammonia. According to the aforesaid pending application, the purification of such condensation product to remove ammonium chloride and other impurities may be carried out by extraction with liquid ammonia.

It has now been found that the liquid ammonia extraction of such nitrogen-phosphorus condensation products may be improved by removing the solvent ammonia containing the ammonium chloride from the charge in the extractor by displacement with air or an inert gas such as nitrogen at the end of the extraction period. The extraction may be carried out in a pressure vessel provided with a filter unit, or in a suitably arranged filter press. It has been found that the present method results in a great improvement over the direct vaporization of the solvent itself. The advantage of the present method apparently results from the fact that vaporization of ammonia is substantially prevented, a lowering of the solvent ammonia temperature is mitigated so that the high solvent power of the ammonia is retained during the extraction. The improvement resulting from the displacement of ammonia by means of an inert gas is readily seen in the example below, in which the charge and ammonia ratio are substantially equivalent:

|  | Ammonia expansion | Nitrogen displacement |
|---|---|---|
| Crude charge | 1616 | 1500 |
| Wt. percent NH$_4$Cl (orig.) | 67.2 | 67.2 |
| Wt. percent NH$_4$Cl (final) | 40.5 | 3.4 |

2

The inert gas which is employed to blow the ammonia from the extraction mass may be any inert gas which is not reactive with ammonia. Air may also be employed in the form of compressed air. It is also an advantage of the present process that the mass of nitrogen-phosphorus-containing condensation product is obtained at substantially room temperature so that the material may more readily be handled. For example, it has been found that the vaporization of ammonia from a typical extraction charge of the above described material chills the product from 35° C. to below 0° C., whereas the displacement of the ammonia by nitrogen leaves the temperature of the mass substantially unchanged at 35° C.

The material from which ammonia has been vaporized is more difficult to handle, since it contains a large amount of absorbed ammonia which gradually vaporizes during subsequent storage. This results in the condensation of water on the product resulting in a freezing or icing of the surface so that the mass of material must be broken up for subsequent handling after the extraction operation. Such difficulties are avoided by the present method in which the liquid ammonia is displaced or blown out of the product by means of an inert gas under pressure.

My invention is further illustrated by means of the accompanying drawing exemplified in an embodiment of the invention. The process is illustrated by means of a diagrammatic flow sheet of the process in which only the essential elements are shown.

In the drawing, 10 indicates a reactor or autoclave into which ammonia is charged from pipe 11, phosphorus oxychloride is charged from pipe 12 and a solvent such as as hexane is charged from pipe 13. The reaction is so conducted as to yield an ammonia-insoluble reaction product of the phosphorus oxychloride and ammonia, after which the major portion of the solvent may be removed from vent 14. In order to aid in the removal of solvent the reactor may be heated by means of temperature control jacket 15.

The crude product leaves the reactor by means of pipe 20 and is then passed to drier 21, from which further solvent may be removed by means of line 22.

In order to remove by-product ammonium chloride from the phosphorus-nitrogen condensation product, the dry material may be transferred by line 23 to an extractor or filter 30. The extractor may be a suitable vessel provided with filter element 31 for the retention of the insoluble condensation product. The extractor is also provided with lines 35 and 36 for the introduction of nitrogen under pressure and of liquid ammonia, although a common entry may be employed. The vessel is also provided with a drawoff 34 for the removal of ammonia containing the dissolved by-product ammonium chloride.

In the operation of the extraction process the crude phosphorus-nitrogen compound is charged to the extractor, after which sufficient liquid ammonia for the solution of the contained ammonium chloride is added. The mixture may be agitated, if desired, or may be extracted simply by passage of liquid ammonia through the mass of crude material. The solvent ammonia, together with the dissolved ammonium chloride, is then released from the vessel. However, in removing the ammonia from the system, it is essential that the nitrogen or other inert gas be introduced under pressure into the extractor to displace the ammonia. It is found that when this step is carried out there is a reduction in the cooling effect which would otherwise result by the vaporization of the liquid ammonia. Thus, the solid material remaining in the filter element or extractor is obtained in substantially pure form and at room temperature.

In order to simplify the description of the invention, the required valves, measuring and control devices have been omitted. The proper placement of such means and devices will be understood by one skilled in the art in view of the foregoing descriptions.

What is claimed is:

1. In the process of extracting ammonium chloride from a mixture with condensation products of phosphorus oxychloride and ammonia obtained by heating the said reactants to a temperature of at least 100° C. but below 150° C., adding liquid anydrous ammonia to said reaction mixture to dissolve ammonium chloride therefrom, and thereafter applying an inert gas pressure to the said mixture to filter therefrom the liquid ammonia containing dissolved ammonium chloride.

2. In a purification by extraction of phosphorus-nitrogen compounds obtained by heating phosphorus oxychloride and ammonia to a temperature of at least 100° C. but below 150° C., said compounds being contained in a vessel to remove soluble impurities therefrom by means of liquid anhydrous ammonia, characterized by a cooling effect in the evaporation of said liquid ammonia, the improvement which comprises repressing the cooling effect of the said solvent ammonia during filtration of the said ammonia from the said compounds in the sail vessel by applying an inert gas pressure to the said ammonia during the said filtration.

3. In the process of extracting ammonium chloride from admixture therewith of condensation products of phosphorus oxychloride and anhydrous ammonia obtained by heating the said reactants to a temperature of at least 100° C. but below 150° C., adding liquid anhydrous ammonia to said reaction mixture to dissolve ammonium chloride therefrom, and thereafter applying nitrogen gas under pressure to the said mixture with the said liquid anhydrous ammonia, to filter the said liquid ammonia containing dissolved ammonium chloride from the said undissolved condensation products.

4. In the process of extracting ammonium chloride from a mixture with condensation products of phosphorus oxychloride and anhydrous ammonia obtained by heating the said reactants to a temperature of at least 100° C. but below 150° C., adding liquid anhydrous ammonia to dissolve ammonium chloride therefrom, and thereafter applying air under pressure to the said mixture with the said liquid anhydrous ammonia to filter from the said mixture the liquid ammonia containing dissolved ammonium chloride.

DONALD A. HIGH.

References Cited in the file of this patent

UNITED STATES PATENTS

| Number | Name | Date |
|---|---|---|
| 525,970 | Storer et al. | Sept. 11, 1894 |
| 2,052,886 | Leroy | Sept. 1, 1936 |
| 2,088,497 | Tijmstra | July 27, 1937 |
| 2,163,085 | Cupery | June 20, 1939 |
| 2,482,756 | Ford et al. | Sept. 27, 1949 |

OTHER REFERENCES

Franklin et al.: Amer. Chem. Journal, vol. 20 (1898), pages 820 and 826.

Gladstone: Journ. Chem. Soc., vol. 7 (1869), pages 16–19.